United States Patent
Ketfi-Cherif et al.

(10) Patent No.: US 9,783,190 B2
(45) Date of Patent: Oct. 10, 2017

(54) METHOD AND DEVICE FOR MANAGING THE ENERGY OF A HYBRID VEHICLE

(71) Applicant: RENAULT s.a.s., Boulogne-Billancourt (FR)

(72) Inventors: Ahmed Ketfi-Cherif, Elancourt (FR); Karima Nair, Puteaux (FR); Maxime Debert, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/036,630

(22) PCT Filed: Nov. 4, 2014

(86) PCT No.: PCT/FR2014/052796
§ 371 (c)(1),
(2) Date: May 13, 2016

(87) PCT Pub. No.: WO2015/092173
PCT Pub. Date: Jun. 25, 2015

(65) Prior Publication Data
US 2016/0264126 A1   Sep. 15, 2016

(30) Foreign Application Priority Data
Dec. 16, 2013 (FR) ..................... 13 62679

(51) Int. Cl.
*B60L 9/00* (2006.01)
*B60W 20/15* (2016.01)
(Continued)

(52) U.S. Cl.
CPC ............. *B60W 20/15* (2016.01); *B60L 1/003* (2013.01); *B60L 11/14* (2013.01);
(Continued)

(58) Field of Classification Search
CPC ...... B60W 20/15; B60W 20/13; B60W 10/06; B60W 20/00; B60L 1/003; B60L 11/14;
(Continued)

(56) References Cited

U.S. PATENT DOCUMENTS 6,664,651 B1 * 12/2003 Kotre .................... B60K 6/365
                                                                    180/65.245
2004/0178756 A1    9/2004 Zhenxing
(Continued)

FOREIGN PATENT DOCUMENTS

| DE | 10 2007 060 691 A1 | 7/2008 |
| DE | 10 2010 009 565 A1 | 9/2011 |
| DE | 10 2011 087 969 A1 | 2/2013 |

OTHER PUBLICATIONS

International Search Report Issued Jul. 21, 2015 in PCT/FR14/052796 Filed Nov. 4, 2014.
(Continued)

*Primary Examiner* — Gertrude Arthur Jeanglaude
(74) *Attorney, Agent, or Firm* — Oblon, McClelland, Maier & Neustadt, L.L.P.

(57) ABSTRACT

A method manages energy of a hybrid vehicle. The vehicle includes a heat engine, one or more electric traction motors, a high-voltage traction battery, a low-voltage on-board battery for accessories of the vehicle, a current inverter to transform direct currents into alternating currents for the electric motor, and a reversible current transformer to convert high-voltage current into low-voltage current of the on-board battery and to use a stock of energy available in the low-voltage battery to not draw energy from the high-voltage battery when it has a relatively low level of charge. The method includes determining an operating point of the vehicle involving a minimum fuel consumption in the heat engine by imposing on the electric motor a torque that minimizes a criterion of total fuel consumption by the
(Continued)

consumption of the heat engine, power consumed in the traction battery, and power consumed in the on-board battery.

9 Claims, 4 Drawing Sheets

(51) Int. Cl.
| | |
|---|---|
| *B60L 1/00* | (2006.01) |
| *B60L 11/14* | (2006.01) |
| *B60L 11/18* | (2006.01) |
| *B60L 15/20* | (2006.01) |
| *B60W 10/06* | (2006.01) |
| *B60W 10/08* | (2006.01) |
| *B60W 10/26* | (2006.01) |
| *B60W 20/00* | (2016.01) |
| *H02J 7/14* | (2006.01) |
| *H02J 7/34* | (2006.01) |
| *B60W 20/13* | (2016.01) |

(52) U.S. Cl.
CPC ....... *B60L 11/1861* (2013.01); *B60L 11/1868* (2013.01); *B60L 15/2045* (2013.01); *B60W 10/06* (2013.01); *B60W 10/08* (2013.01); *B60W 10/26* (2013.01); *B60W 20/00* (2013.01); *B60W 20/13* (2016.01); *H02J 7/1423* (2013.01); *H02J 7/1438* (2013.01); *H02J 7/34* (2013.01); *B60L 2210/12* (2013.01); *B60L 2210/14* (2013.01); *B60L 2210/40* (2013.01); *B60L 2240/12* (2013.01); *B60L 2240/34* (2013.01); *B60L 2240/423* (2013.01); *B60L 2240/443* (2013.01); *B60L 2240/547* (2013.01); *B60L 2250/26* (2013.01); *B60L 2270/12* (2013.01); *B60W 2510/244* (2013.01); *B60W 2540/10* (2013.01); *B60W 2560/00* (2013.01); *B60W 2710/083* (2013.01); *B60Y 2200/92* (2013.01); *B60Y 2300/52* (2013.01); *Y02T 10/56* (2013.01); *Y02T 10/6286* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7225* (2013.01); *Y02T 10/7233* (2013.01); *Y02T 10/7241* (2013.01); *Y02T 10/7283* (2013.01); *Y10S 903/906* (2013.01)

(58) Field of Classification Search
CPC .............. B60L 11/1861; B60L 11/1868; B60L 15/2045; B60L 2210/14; B60L 2240/12; H02J 7/1438; H02J 7/34
USPC ........................................ 701/22; 180/65.265
See application file for complete search history.

(56) References Cited

U.S. PATENT DOCUMENTS

| | | |
|---|---|---|
| 2008/0215199 A1 | 9/2008 | Aoyama et al. |
| 2010/0136390 A1 | 6/2010 | Ueda et al. |
| 2011/0025127 A1 | 2/2011 | Choi et al. |
| 2013/0038271 A1* | 2/2013 | Park ........................ B60K 6/28 320/104 |

OTHER PUBLICATIONS

French Search Report Issued Sep. 18, 2014 in French Application No. 1362679 Filed Dec. 16, 2013.

* cited by examiner

METHOD AND DEVICE FOR MANAGING THE ENERGY OF A HYBRID VEHICLE

The present invention relates to the management of the energy of a hybrid vehicle.

More precisely, the invention relates to a method and a device for managing the energy of a hybrid vehicle comprising a heat engine and one or more electric traction motors.

A power train for a vehicle with hybrid propulsion or drive comprises a heat engine and one or more electric motors, powered by at least one traction battery installed on-board the vehicle. The power supply of the electric motor(s) is ensured by one or more high-voltage batteries, whereas the general electrical architecture of the vehicle (starter, devices, air-conditioning, etc.) is powered by a low-voltage on-board battery.

The vehicle benefits from a number of elements for assuring the movement of said vehicle. Its energy management device has a degree of freedom to provide the torque requested by the driver, that is to say the distribution of power between the heat engine and the electric motor. The optimization of the management of the energy flows can meet various objectives, for example the dynamic performances of the vehicle, the minimization of the fuel consumption, or the limitation of carbon dioxide or polluting particle emissions. The principle applied in order to select the best operating point may consist of minimizing a criterion of fuel consumption in grams per unit of time (g/h) equal to the sum of the consumption of the engine "Conso Mth (g/h)" and of the electrical consumption by weighting the energy of electrical origin $P_{battery}$ (W) by a weighting or equivalence factor K in an equation of the type: Criterion (g/h)=Conso Mth (g/h)+$K \cdot P_{battery}$ (W). The equivalence factor represents the cost of the electrical energy stored in the battery. It can be controlled in various ways, in particular discreetly on the basis of the current state of energy of the battery (the lower the charge of the battery, the higher it is), and on the basis of the running conditions of the vehicle, for example in accordance with the teaching of publication FR 2 988 674.

By using $T_{drive}$ for the torque requested by the driver, $T_{SG}$ for the electrically provided torque, and $T_{CE}$ for the thermally provided torque, the distribution of the torque between the two drive sources can be written $T_{drive}=T_{SG}+T_{CE}$. Expressed in fuel, the criterion of energy consumption C at an operating point of the PT is written as the sum of the fuel consumption $Q_{fuel}$ (dependent on the torque $T_{CE}$ and the speed $\omega_{CE}$) and the electrical consumption translated into an equivalent of consumed fuel: $C=Q_{fuel}(T_{CE},\omega_{CE})+K \cdot P_{bat}$. The electrical balance of the battery $P_{bat}$ is then the sum of the electric driving power $\omega_{SG} \cdot T_{SG}$, and of the electrical losses $P_{loss}$ of the electric motor and of the inverter supplying an AC voltage to said motor from the battery: $P_{bat}=\omega_{SG} \cdot T_{SG}+P_{loss}(\omega_{SG} \cdot T_{SG})$.

As summarized in FIG. 1, the calculation made on the basis of the torque requested by the driver $T_{drive}$, the speed of the heat engine $\omega_{CE}$, and the equivalence factor K of the high-voltage battery, makes it possible to determine the value of the optimal electric torque $T_{SG}$ at any moment. However, since the speed of the electric motor and that of the heat engine are proportional at each transmission ratio, the only degree of freedom allowing energy optimization of the PT is the electrically provided torque $T_{SG}$.

The object of the present invention is to improve the overall energy optimization of a hybrid PT by introducing an additional degree of freedom into the optimal consumption calculation.

With this objective, the invention takes into account the energy contained in the low-voltage battery when managing the energy of the vehicle.

For this purpose, the invention uses a reversible transformer making it possible to use the stock of energy available in the on-board vehicle battery so as not to draw energy from the traction battery when the latter has an excessively low level of charge.

The proposed method is based on the selection of an operating point, in response to the torque request from the driver, involving a minimal consumption of fuel in the heat engine. This operating point is determined by forcing the electric motor to provide a torque minimizing a criterion of total fuel consumption by the consumption of the heat engine, the power consumed in the traction battery, and the power consumed in the on-board battery.

The energy stored in the on-board vehicle battery, generally not taken into account in the energy flows of a hybrid vehicle, is utilized. The proposed measures utilize the potential of the on-board vehicle battery in the management of the energy flows, in particular so as to minimize the criterion of energy consumption, and to optimize the management of the power consumed by the accessories of the vehicle. By taking into account this store of energy and by optimizing the use thereof, it is thus possible to reduce the overall energy consumption of the vehicle. The benefits of this strategy are all the greater, the lower the energy storage capability of the traction battery.

Further features and advantages of the present invention will become clearer from the following description of a non-limiting embodiment thereof, given with reference to the accompanying drawings, in which.

Figure 3:
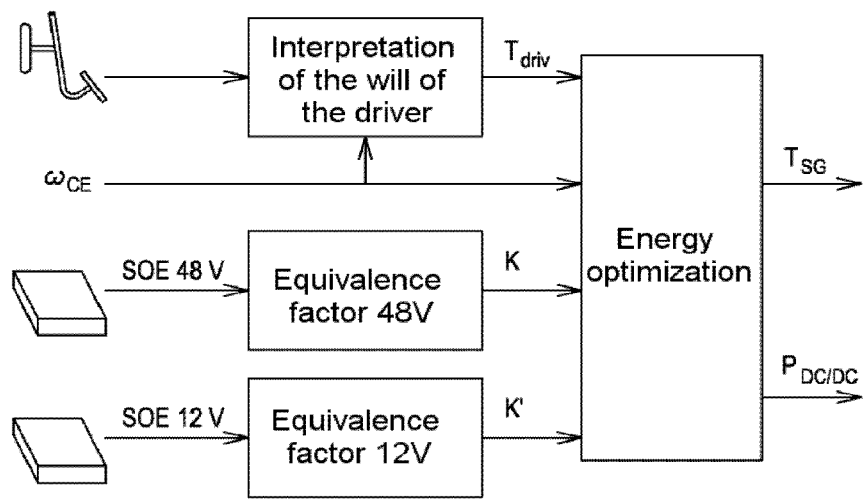
Figure 4:
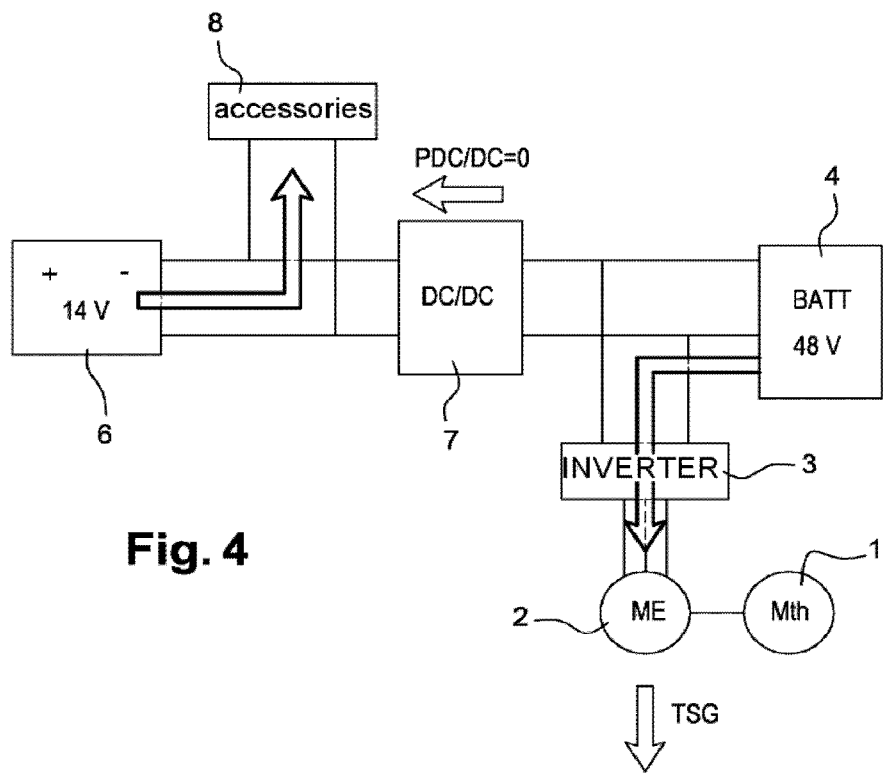
Figure 5:
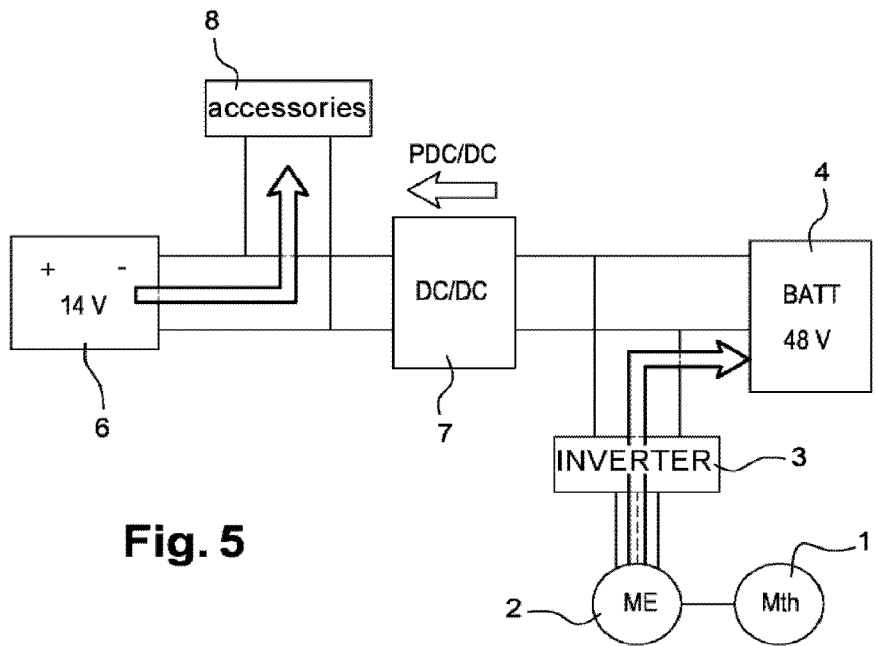
Figure 6:
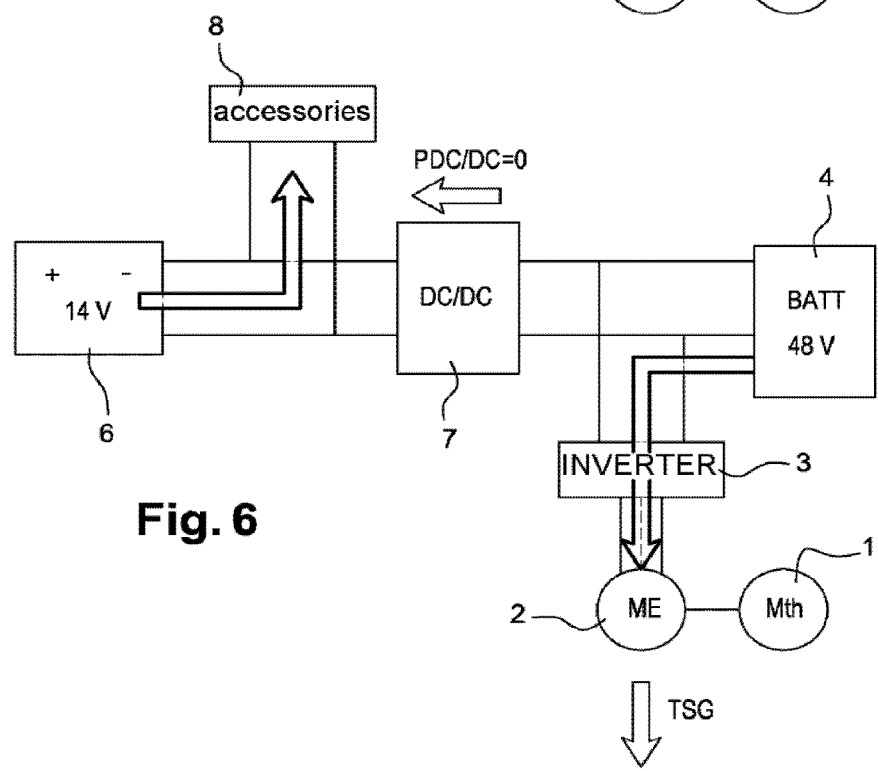
Figure 7:
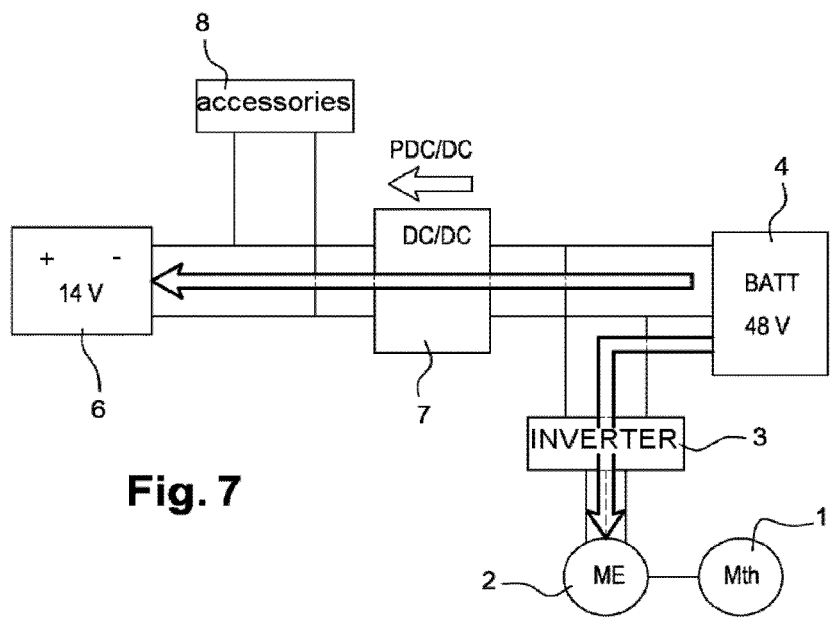
Figure 8:
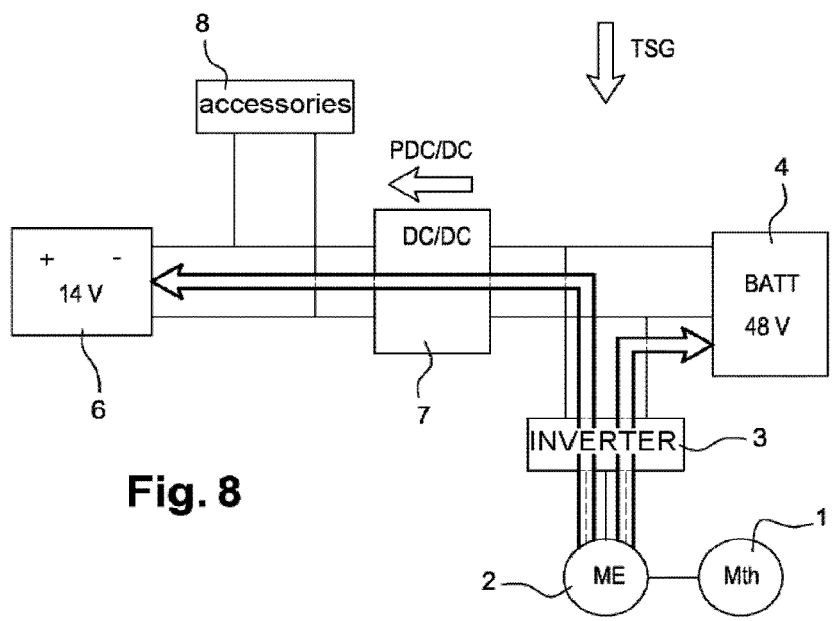

FIG. 3 is a new optimization algorithm including an additional degree of freedom, FIG. 4 shows the electrical flows in a drive scenario with a charged 14V battery, FIG. 5 shows the electrical flows during recharging with a charged 14V battery, FIG. 6 shows the electrical flows in a drive scenario with two charged batteries, FIG. 7 shows the electrical flows in a drive scenario with the 14V battery having a very low charge, and FIG. 8 shows the electrical flows during recharging with the 14V battery having a very low charge.

Figure 1:
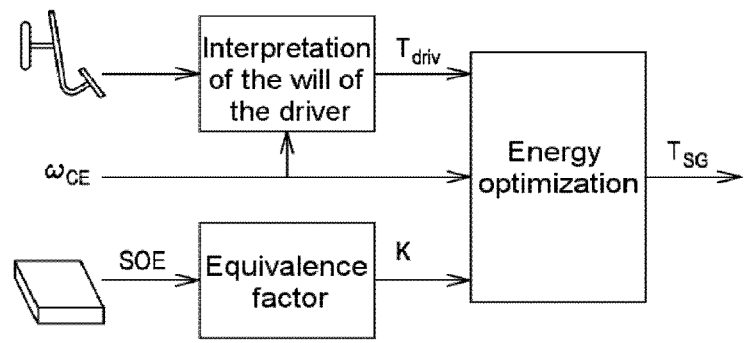
FIG. 1 is an optimization algorithm located in the computer of a hybrid PT.

FIG. 1 shows, in summary, the basic principle of energy optimization in a hybrid vehicle, which results in imposing a torque setpoint $T_{SG}$ on the electric motor, making it possible to optimize the criterion of fuel consumption expressed in equivalent grams of fuel (g) per hour (h) in the equation: Criterion (g/h)=Conso Mth (g/h)+K·Pbattery (W). The vehicle in question comprises a heat engine 1. It can comprise one or more electric traction motors 2, at least one high-voltage traction battery 4 and a low-voltage on-board battery 6 for the accessories 8 of the vehicle. A current inverter 3 transforms the direct currents provided by the traction battery 2 and by the on-board battery 6 into alternating currents for the electric motor 2. A current transformer 7 converts the high-voltage current of the traction battery 4 into low-voltage current of the on-board battery 6.

In this optimization calculation, the input variables are the engine torque request $T_{drive}$, interpreted on the basis of the action of the driver on the accelerator pedal, the speed of the heat engine $\omega_{CE}$, and the equivalence factor K, taking into account the state of charge of the battery (SOC). The electric torque $T_{SG}$, which is linked to the equivalence factor K, is the only degree of freedom for determining the operating point of the PT.

The new optimization technique uses an additional degree of freedom in this type of calculation. The energy is still distributed between electric motor power and heat engine power, however the invention takes into account the buffer of energy available in the battery of the low-voltage network in order to calculate the electrically provided torque.

Figure 2:
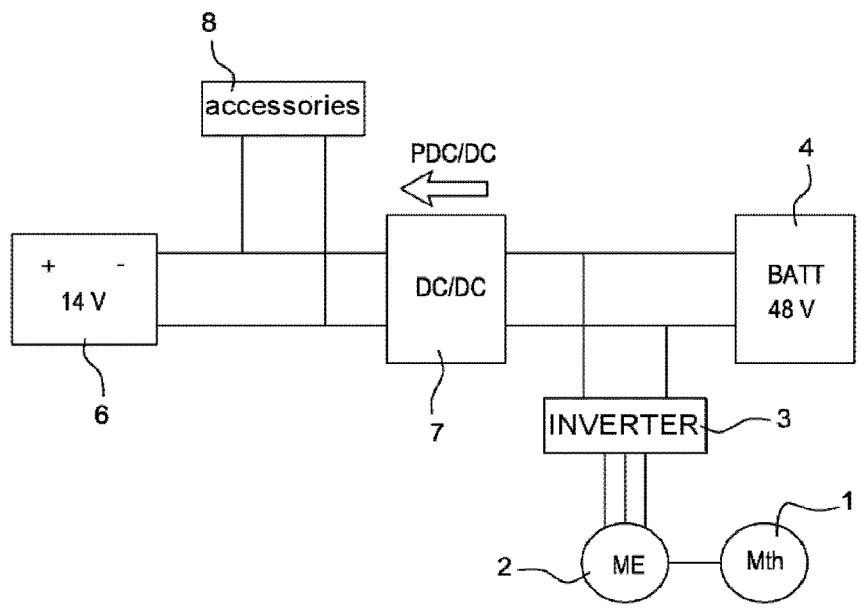
FIG. 2 is a diagram of the electrical architecture of a hybrid vehicle.

FIG. 2 schematically shows the device for managing the energy of a hybrid vehicle in question. This device comprises a heat engine 1, one or more electric traction motors 2, at least one high-voltage traction battery 4, and a low-voltage on-board battery 6 for the accessories 8 of the vehicle. The heat engine 1 of the vehicle is mechanically connected by the transmission to the electric motor 2, which delivers the electrically provided traction torque $T_{SG}$. The inverter assures the transformation of the direct currents provided by the traction battery 4 and by the on-board battery 6 into alternating currents for the electric motor 2. In accordance with the invention, the transformer 7 has reversible operation, which makes it possible to use the stock of energy available in the low-voltage battery 6 so as not to draw energy from the high-voltage battery 4 when the latter has an excessively low level of charge (SOC). From now on, the operating point of the hybrid vehicle involving the minimum fuel consumption in the heat engine is determined by imposing on the electric motor 2 a torque $T_{SG}$ that minimizes a criterion of total fuel consumption by the consumption of the heat engine ConsoMth (g/h), the power consumed in the traction battery $P_{bat}^{HT}$, and also the power consumed in the on-board battery $P_{bat}^{BT}$. At each operating point of the PT, the values of the electrically provided torque $T_{SG}$ and of the power of the transformer $P_{DC/DC}$ are determined, thus making it possible to minimize the criterion of total fuel consumption (ConsoMth (g/h)).

This new regulation is governed by the following equations (in which a negative power is assumed in recharging mode by convention):

$$P_{bat}^{HT} = \omega_{SG} \cdot T_{SG} + P_{loss} + P_{DC/DC}$$

$$P_{bat}^{BT} = P_{DC/DC} + P_{acc}$$

where $P^{HT}_{bat}$ is the power consumed in the high-voltage battery 4, and $P^{BT}_{bat}$ is the power consumed in the low-voltage battery 6. The power consumed in the transformer 7 is $P_{DC/DC}$. The power consumed in the high-voltage battery $P_{bat}^{HT}$ is the sum of the electrical traction energy provided to the wheels of the vehicle $\omega_{SG} \cdot T_{SG}$, of electrical losses $P_{loss}$ of the electric motor 2 and of the inverter 3, and of the power $P_{DC/DC}$ consumed in the converter 7. The power $P_{bat}^{BT}$ consumed in the low-voltage battery 6 is equal to the sum of the power $P_{acc}$ consumed in the accessories 8 and of the power $-P_{DC/DC}$ provided by the converter 7.

If the high-voltage battery 4 is a battery of 48V (48 volts) and the low-voltage battery 6 is a battery of 14V (14 volts), the criterion of consumption making it possible to find the operating point having the minimum fuel consumption is in this example:

Criterion(g/h)=ConsoMth(g/h)+K·Pbattery_48V(W)+ K'·Pbattery_14V(W)

In this equation, the power consumed in the traction battery $P_{bat}^{HT}$ (Pbattery_48V) and the power consumed in the on-board battery $P_{bat}^{BT}$ (Pbattery_14V) are modulated in the criterion of total consumption (ConsoMth(g/h)) by equivalence factors K, K', taking into account the respective levels of charge of said batteries. The power of the low-voltage battery is modulated by its own equivalence factor K'. For each operating point of the PT, a pair of values ($T_{SG}$, $P_{dc/dc}$) is thus obtained, which makes it possible to minimize the fuel consumption. The degrees of freedom calculated again are now the electrically provided torque and the power of the transformer $P_{dc/dc}$, which are given from the state of the two equivalence factors K and K'.

The new algorithm for calculating the minimum consumption is illustrated in FIG. 3. The equivalence factor K' of the 14V battery has been added to the three calculation inputs in the block of FIG. 1 and is dependent on the level of charge (SOE) of said battery.

In addition, instead of recharging solely the battery 48V by the heat engine (in generator mode), as is currently the case, the invention proposes distributing the charge between the two batteries. The electrical charge provided by the electric motor 2 operating as a generator is distributed between the traction battery 4 and the on-board battery 6. Because the 14V battery is regularly recharged, the transfer of energy from the 48V battery to the 14V battery in order to power the accessories, which is accompanied by a loss of yield, can be avoided. For this, the control now relates not only to the electrically provided torque $T_{SC}$, but also to the power $P_{dc/dc}$ of the transformer 7.

If, for example, the 14V battery is highly charged, its equivalence factor K' is low. The 48V battery is discharged. Its own equivalence factor K is high (see FIG. 4). In a drive scenario, the new criterion of minimization tends to increase the component of the low voltage to the detriment of that of the high-voltage battery in the provision of electrical energy to the wheels. Since the electric motor must be powered, the adjustment is made to the battery power transferred to the low voltage $P_{dc/dc}$. This reduces, such that the component of the 14V battery in the power supply of the accessories increases, whereas that of the 48V battery decreases. In accordance with FIG. 4, the 48V battery can then power solely the electric motor 2, whereas the 14V battery alone powers the accessories 8.

In recharging mode (see FIG. 5), the consumption of the heat engine is zero, such that the minimization of the energy criterion is dependent only on the distribution of the electrical energy to be distributed, between the 14V battery and the 48V battery. Since the equivalence factor K of the traction battery (48V) is high, the function minimizes $P_{battery\_48V}$. Since the equivalence factor K' of the on-board battery is low, it increases $P_{battery\_14V}$. $P_{dc/dc}$ tends toward 0, so recharging is implemented solely from the electric engine to the traction battery, whereas the 14V battery powers the accessories 8 autonomously.

In drive mode, with the two batteries highly charged (see FIG. 6), the two equivalence factors K and K' are very low. The minimization function tends to impose the use of the two batteries, and therefore also to decrease $P_{dc/dc}$ since K' is low. The 14V battery powers the accessories alone, and the 48V battery dedicates all its energy to the electric drive. In this situation no fuel is consumed.

In drive mode with the 14V battery practically discharged and the 48V battery charged (see FIG. 7), the 48V battery delivers energy both to the 14V battery and to the electric motor.

In recharging mode with the 14V battery practically discharged and the 48V battery charged (see FIG. 8), the recharging of the battery 14V is favored. If the recharging torque is sufficiently strong, it is possible to recharge the 48V battery simultaneously.

The invention claimed is:

1. A method for managing energy of a hybrid vehicle comprising a heat engine, one or more electric traction motors, at least one high-voltage traction battery, a low-voltage on-board battery for accessories of the vehicle, a current inverter to transform direct currents provided by the traction battery and by the on-board battery into alternating currents for the electric motor, and a reversible current transformer configured to convert high-voltage current of the traction battery into low-voltage current of the on-board battery and to use a stock of energy available in the low-voltage battery so as not to draw energy from the high-voltage battery when the high-voltage battery has a relatively low level of charge, the method comprising:
 determining an operating point of the vehicle involving a minimum fuel consumption in the heat engine by imposing on the electric motor a torque that minimizes a criterion of total fuel consumption by the consumption of the heat engine, power consumed in the traction battery, and power consumed in the on-board battery.

2. The method for managing energy as claimed in claim 1, wherein the power consumed in the traction battery and the power consumed in the on-board battery are modulated by equivalence factors, taking into account respective levels of charge of said batteries.

3. The method for managing energy as claimed in claim 2, wherein the power consumed in the high-voltage battery is a sum of provided electrical traction energy, electrical losses of the electric motor and of the inverter, and power consumed in the converter.

4. The method for managing energy as claimed in claim 2, wherein the power consumed in the low-voltage battery is equal to the sum of power consumed in the accessories and of the power provided by the converter.

5. The method for managing energy as claimed in claim 2, wherein values of the electrically provided torque and of power of the transformer are determined at each operating point of the engine to minimize the criterion of total fuel consumption.

6. The method for managing energy as claimed in claim 1, wherein an electrical charge provided by the electric motor operating as a generator is distributed between the traction battery and the on-board battery.

7. A device for managing energy of a hybrid vehicle comprising a heat engine, one or more electric traction motors, at least one high-voltage traction battery, a low-voltage on-board battery for accessories of the vehicle, and a current inverter to transform direct currents provided by the traction battery and by the on-board battery into alternating currents for the electric motor, the device comprising:
 a reversible current transformer between the traction battery and the on-board battery, a power of the transformer being determined at each operating point of the engine, as well as a value of traction torque imposed on the electric motor, so as to minimize a criterion of fuel consumption totaling a consumption of the heat engine, a power consumed in the traction battery, and a power consumed in the on-board battery.

8. The management device as claimed in claim 7, wherein a value of the traction torque and of a power of the transformer are given from a state of two equivalence factors, modulating, respectively, the component of the power consumed in the traction battery and the power consumed in the on-board battery.

9. The management device as claimed in claim 8, wherein the equivalence factors are dependent, respectively, on a level of charge of the traction battery and the on-board battery of the vehicle.

* * * * *